(No Model.)
J. E. PERRY.
LANTERN OR LAMP.
No. 430,680. Patented June 24, 1890.
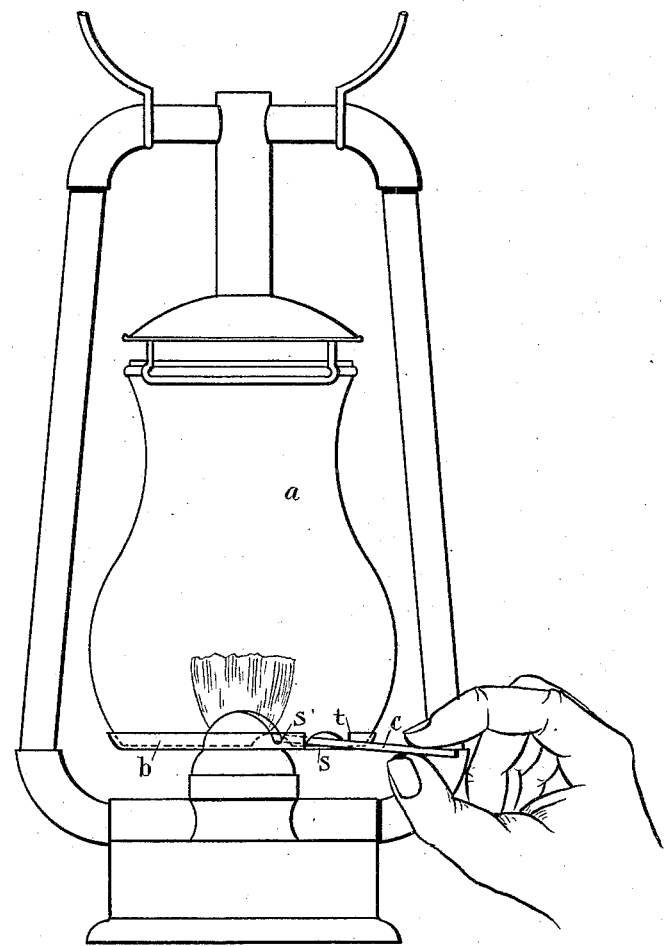
WITNESSES:
INVENTOR
BY
ATTORNEY

UNITED STATES PATENT OFFICE.

JOHN E. PERRY, OF WAKEFIELD, RHODE ISLAND.

LANTERN OR LAMP.

SPECIFICATION forming part of Letters Patent No. 430,680, dated June 24, 1890.

Application filed September 9, 1889. Serial No. 323,443. (No model.)

*To all whom it may concern:*

Be it known that I, JOHN E. PERRY, of Wakefield, in the county of Washington, in the State of Rhode Island, have invented certain new and useful Improvements in Lanterns or Lamps, of which the following is a specification, reference being had to the accompanying drawing, making part hereof.

This invention relates to lantern, lamp, and other appliances for illumination or heating using glass or other chimneys to protect the flame or produce a draft of air to assist combustion; and it consists of a device for lighting the wick when the chimney is in position on the lamp without raising or removing the chimney from the socket or rim which supports it.

In lamps of ordinary construction it is often difficult to replace the chimney after lighting the wick, because of the spring of the parts that hold it, and sometimes the wick has to be raised or lowered after being lighted, and there is great liability of smoking or breaking it because the chimney cannot be put back quickly enough.

The drawing is an elevation of a lantern, showing all the parts of my improvement as applied to it.

The chimney or glass body $a$ has a small notch or opening $s$, preferably semi-annular, made in its lower edge, and a corresponding notch $t$ is cut in the upraised rim $b$ of the base-plate. When the opening $s$ in the glass and the notch $t$ in the rim $b$ are made to coincide by rotating the glass $a$, a continuous opening through the rim and glass from the outside will be established, and a lighted match $c$ can readily be inserted through this opening and applied to the wick of the lamp for the purpose of lighting it. When the lighting has been effected and the match $c$ withdrawn, the chimney or glass $a$ may be rotated a little in either direction, and the opening $s$ in the glass will pass behind the rim $b$ and be closed as in the position shown by the dotted lines $s'$, so as not to allow the wind to affect the flame or impair the draft.

This improvement, with very slight modification, can be applied to most lamps using chimneys, and when the chimney is held in place by springs only a slight portion of the sheet-metal plate on which the chimney rests may be turned up to serve as a cover or screen, behind which the opening $s$ may be turned to close it.

Having thus described my improvements, I claim as my invention—

A lantern or lamp provided with a lower base-plate having an annular projection or upraised rim $b$ integral therewith and an opening $t$ through said rim, in combination with the glass cylinder or chimney $a$, having in its lower edge a corresponding opening $s$, adapted to register with the opening $t$ and to be closed by partial rotation of the chimney without removal thereof, substantially as and for the purpose set forth.

JOHN E. PERRY.

Witnesses:
JOHN G. PERRY,
H. B. PERRY.